J. STEPHENSON.
Street-Car.
No. 6,428. Reissued May 11, 1875.
FIG. I.
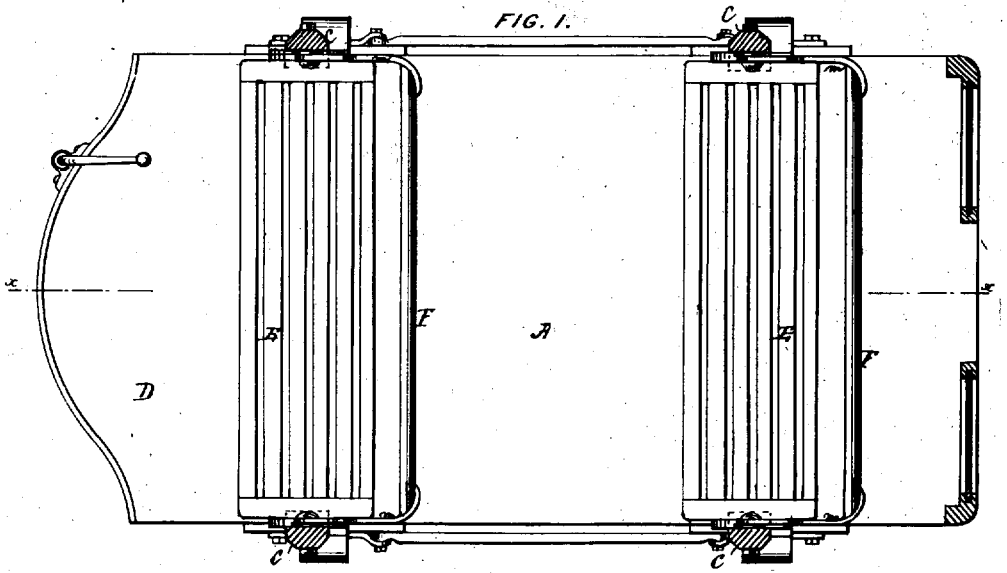
FIG. II.
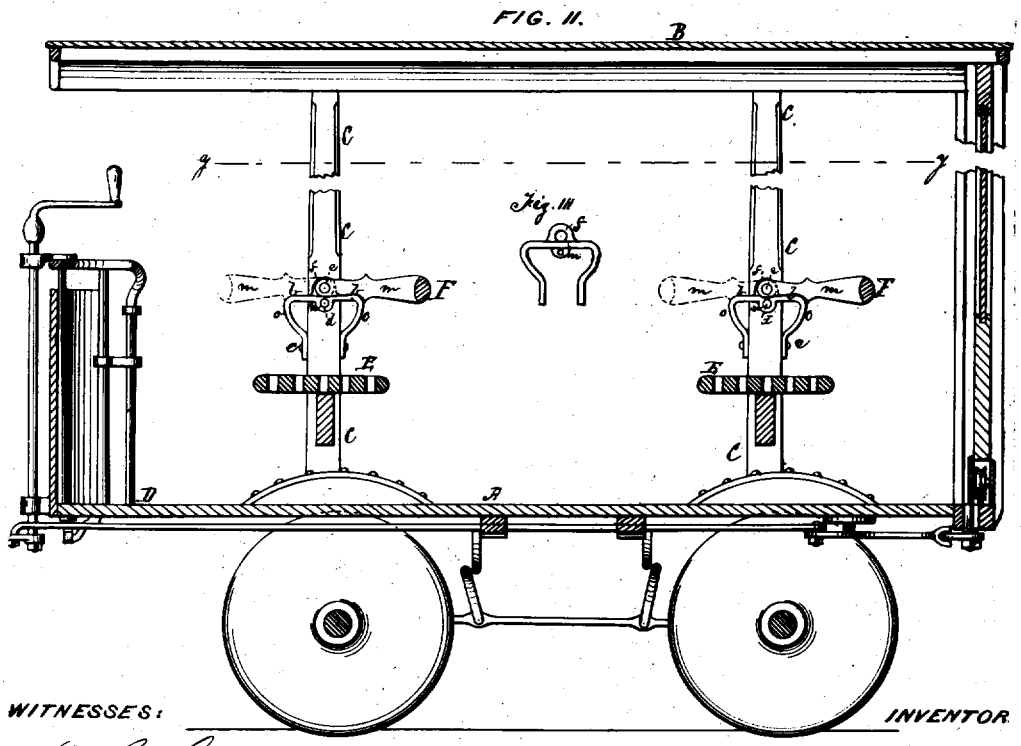
WITNESSES:
D. G. Stuart
M. Knight
INVENTOR.
John Stephenson
per S. Hannay
atty.

UNITED STATES PATENT OFFICE.

JOHN STEPHENSON, OF NEW YORK, N. Y.

IMPROVEMENT IN STREET-CARS.

Specification forming part of Letters Patent No. 155,118, dated September 15, 1874; reissue No. 6,428, dated May 11, 1875; application filed April 20, 1875.

DIVISION *b* of B B.

*To all whom it may concern:*

Be it known that I, JOHN STEPHENSON, of New York, in the county of New York and State of New York, have invented certain new and useful Improvements in Street-Cars; and I do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 1 represents a horizontal section of a street-car, to which my improvement has been applied, as taken through the line *y y* of Fig. 2; and Fig. 2 a vertical longitudinal section of the same as taken through the line *x x* of Fig. 1. Fig. 3 represents a detached view of the rest or support of the turn-over back.

This division of my invention relates solely to a new and improved construction of the rest or support for turn-over backs for car-seats, whereby it not only constitutes a support for the turn-over back, but for the elbow or arm of the passenger next to it, and at the same time forms a grab-handle for the passengers as they enter or leave the car and a protection against falling out when seated.

To enable others skilled in the art to make, construct, and use my invention, I will now proceed to describe its parts in detail, omitting a description of such parts of a car as are non-essential to a full understanding of the improvement.

The car to which my improvement is applied belongs to the class known as summer or excursion cars; in other words, that class of cars in which the exit and entrance openings *a* are arranged at the sides of the cars, there being no window-openings proper.

In the drawings, A represents the floor; B, the roof; C C, the standards that support the latter, and D the driver's platform. E E represent slatted seats in common use on such cars, and which are supported on cross-timbers, F, tenoned into the sides of the two opposite standards C, or otherwise secured in any known way. At a suitable height above each end of the seats E is arranged and secured to standards C a metallic rest or support, *b*, shaped and constructed substantially as shown in Figs. 1 and 3. Instead of rounded angles at its upper edges it may be angularly shaped, but the former method is preferred. This rest is firmly secured to the front and rear edges of standards C by a bolt *c*, and to the inner face of the same by a screw or screw-bolt, *d*, passing through a lug, *n*, formed on its under side. On the upper side of rest *b*, immediately above lug *n*, may or not be formed another lug, *f*, (see Fig. 3,) to which and the standard C the turn-over back F is pivoted. This lug acts as a protection to the face of the standards C. The upper side of rest *b* is made sufficiently broad and of such shape as to form a comfortable support for the arm of the passenger. The arms *m* of the turn-over back on their upper and under sides are made of conformable shape to the upper side of the rest *b*, so as to fit snugly on its upper side, and thus obtain a solid support therefrom, as for instance like that shown in Fig. 2. Rest *b* is provided with arms *o*, which not only serve as braces for the support of rest *b*, but as grab-handles to assist the passengers in getting in and out of the car. Thus constructed the arms *o* and support *b* proper also serve as a protection to the passenger from falling out when once seated.

Having thus described my invention, what I claim as new, and desire to secure by Letters Patent, is—

A support for a turn-over back of a street-car seat, provided with a rest, *b*, for the arms of the passengers, and a grab-handle, *o*, to assist them in getting in and out of the car, substantially as set forth.

In testimony that I claim the foregoing, I have hereunto set my hand this 31st day of October, 1874.

JOHN STEPHENSON.

Witnesses:

WM. JNO. WALKER,

STUART A. STEPHENSON.